(12) United States Patent
McNeeley et al.

(10) Patent No.: US 6,854,608 B2
(45) Date of Patent: Feb. 15, 2005

(54) TURNTABLE

(75) Inventors: Carolyn M. McNeeley, Brunswick, OH (US); John F. Travers, North Royalton, OH (US); Cherry Bochmann, Lakewood, OH (US); Erin Riddell, Lakewood, OH (US)

(73) Assignee: Rubbermaid Incorporated, Wooster, OH (US)

( * ) Notice: Subject to any disclaimer, the term of this patent is extended or adjusted under 35 U.S.C. 154(b) by 0 days.

(21) Appl. No.: 10/079,268

(22) Filed: Feb. 19, 2002

(65) Prior Publication Data

US 2003/0155317 A1 Aug. 21, 2003

(51) Int. Cl.[7] .............................................. A47G 29/00
(52) U.S. Cl. ...................... 211/78; 211/131; 248/349.1
(58) Field of Search ............................ 211/77, 163, 78, 211/129.1, 194, 131.1; 248/349.1, 131, 346 M, 118, 118.1; 108/94, 22

(56) References Cited

U.S. PATENT DOCUMENTS

| 226,645 | A | * | 4/1880 | Albaugh ................... 211/129.1 |
|---|---|---|---|---|
| 1,732,113 | A | * | 10/1929 | Van Der Meer .......... 248/349.1 |
| 1,974,735 | A | * | 9/1934 | Botham ........................ 211/77 |
| 3,302,594 | A | * | 2/1967 | Burnett et al. .............. 108/139 |
| 3,858,529 | A | * | 1/1975 | Salladay ...................... 108/103 |
| 3,972,419 | A | * | 8/1976 | Short ........................... 211/78 |
| 4,117,627 | A |   | 10/1978 | Slingerland, Jr. .............. 47/39 |
| 4,191,437 | A |   | 3/1980 | Funke ......................... 312/305 |
| 4,438,853 | A | * | 3/1984 | Numbers ....................... 211/77 |
| 4,456,805 | A | * | 6/1984 | Jorgensen et al. .......... 219/755 |
| 4,485,997 | A | * | 12/1984 | Potter .......................... 248/544 |
| 4,504,715 | A | * | 3/1985 | Jorgensen et al. .......... 219/755 |
| 4,534,474 | A | * | 8/1985 | Ng ............................... 211/70 |
| 4,549,714 | A |   | 10/1985 | Busch ......................... 248/349 |
| 4,579,473 | A |   | 4/1986 | Brugger ...................... 403/163 |
| 4,620,685 | A |   | 11/1986 | Taguchi ...................... 248/349 |
| 4,635,894 | A | * | 1/1987 | Sammons ................... 248/558 |
| 4,687,198 | A | * | 8/1987 | Smith ........................... 482/77 |
| 4,694,132 | A | * | 9/1987 | Liu ............................. 219/755 |
| 4,700,850 | A | * | 10/1987 | Morgan et al. ........... 211/131.1 |
| 4,738,038 | A | * | 4/1988 | Tanne et al. ................. 40/506 |
| 4,762,237 | A |   | 8/1988 | Newton ....................... 211/115 |
| 4,788,397 | A |   | 11/1988 | Danley ................. 219/10.55 F |
| D301,956 | S |   | 7/1989 | Newton .......................... D7/2 |
| 4,904,190 | A | * | 2/1990 | Plocek et al. ................. 439/15 |
| 4,969,290 | A | * | 11/1990 | Skoretz ......................... 47/39 |
| 5,031,779 | A | * | 7/1991 | Szenay et al. ................ 211/40 |
| 5,318,299 | A |   | 6/1994 | Beaster et al. .......... 273/148 R |
| 5,381,569 | A |   | 1/1995 | Church ......................... 5/81.1 |
| 5,479,867 | A |   | 1/1996 | Blevins et al. ............... 108/94 |
| 5,487,599 | A | * | 1/1996 | Weisburn et al. .......... 312/9.46 |
| 5,533,857 | A |   | 7/1996 | Ferrone ...................... 414/757 |
| D373,865 | S |   | 9/1996 | Wells .......................... D32/54 |
| D378,792 | S |   | 4/1997 | Westcott ..................... D7/501 |
| 5,641,080 | A | * | 6/1997 | Humphrey et al. .......... 211/77 |
| 5,779,309 | A | * | 7/1998 | Lu ......................... 297/344.26 |
| 5,895,021 | A |   | 4/1999 | Rosenband et al. ...... 248/349.1 |
| 6,299,454 | B1 | * | 10/2001 | Henderson et al. .......... 439/19 |
| 6,378,964 | B2 | * | 4/2002 | Robbins et al. ............. 312/305 |

FOREIGN PATENT DOCUMENTS

| EP | 0 153 662 | 9/1985 |
|---|---|---|
| FR | 2 659 721 | 9/1991 |
| FR | 2 672 107 | 7/1992 |

OTHER PUBLICATIONS

PCT International Written Opinion issued in PCT/US03/03920, mailed Dec. 18, 2003.

* cited by examiner

Primary Examiner—Leslie A. Braun
Assistant Examiner—Khoa Tran
(74) Attorney, Agent, or Firm—Marshall, Gerstein & Borun LLP

(57) ABSTRACT

A turntable for storing one or more items, including a base having a first diameter and a top rotatably coupled to the base and having a second diameter and a surface for storing the one or more items. The first dimension is larger than the second dimension to provide an offset so that objects stored adjacent the base do not interfere with rotation of the top.

23 Claims, 13 Drawing Sheets

TURNTABLE

FIELD OF THE INVENTION

The present invention relates to a storage device such as a turntable.

BACKGROUND OF THE INVENTION

Storage devices such as turntables are generally known for storing food or food-related items (and sometimes are referred to a "lazy-susan"). Known turntables include a base and a top rotatably mounted to the base by a bearing arrangement. The top for such known turntables may include a plurality of spaced apart layers and is typically configured to rotate to provide access to a particular item which may be located anywhere on the top (i.e., without having to move other items) or to allow one to browse the items being stored on the top.

However, known turntables have several disadvantages. For example, many known turntables are difficult to rotate in "crowded" storage areas because objects stored adjacent to the turntable interfere with the rotation of the top. Additionally, the tops for known turntables can become dislocated from the base when such adjacent objects interfere with the top. Further, user interfaces on known turntables are not easily accessible or operable by the user, and are not separate from (and may come in contact with) stored items (which may include raw meats, unpackaged foods, etc.). Further, known turntables become increasingly difficult to use when debris (e.g., crumbs, liquids, etc.) accumulates around the bearing arrangement and interferes (i.e., gums-up) with its ability to rotate.

To provide an inexpensive, reliable, and widely adaptable turntable that avoids the above-referenced and other problems would represent a significant advance in the art.

SUMMARY OF THE INVENTION

A primary feature of the present invention is to provide an inexpensive, easy-to-manufacture and aesthetically-pleasing turntable that overcomes the above-noted disadvantages.

Another feature of the present invention is to provide a turntable that continues to operate even when objects are stored directly adjacent to it (even when adjacent objects are stored in contact with the base).

Another feature of the present invention is to provide a top that removes quickly and easily from the base for cleaning/dishwashing and is quickly and easily reinstalled without disturbing or exposing the steel ball bearings located in the base section.

Another feature of the present invention is to provide a turntable with a user interface that is operable without having to expose one's hands or fingers to the items being stored on the turntable (or the surfaces that store such items). The user interface may also be adapted to provide a labeling or other informational surface.

Another feature of the present invention is to provide a turntable that has a receptacle to catch debris so that the turntable continues to operate as debris falls between the top and the base.

How these and other advantages and features of the present invention are accomplished (individually, collectively, or in various subcombinations) will be described in the following detailed description of the preferred and other exemplary embodiments, taken in conjunction with the FIGURES. Generally, however, they are accomplished in a turntable for storing one or more items, including a base having a first diameter, a top rotatably coupled to the base, and having a second diameter and a surface for storing the one or more items. The first dimension is larger than the second dimension to provide an offset so that objects stored adjacent the base do not interfere with rotation of the top.

These and other advantages and features of the disclosed embodiments may also be accomplished in a turntable for storing one or more items, including a base having a first dimension representative of a maximum distance between exterior edges of the base, a top rotatably coupled to the base, and a bearing disposed between the base and the top. The top includes a surface for storing the one or more items and a second dimension representative of a maximum distance between exterior edges of the top. The first dimension is larger than the second dimension to provide an offset.

These and other advantages and features of the disclosed embodiments may also be accomplished in a turntable for storing one or more items including a base, a top rotatably coupled to the base, and a bearing disposed between the base and the top. The base includes a first diameter, an inner rim, and a first peripheral groove. The top includes a surface for storing one or more items, a second diameter, and one or more hooks that slidably engage the inner rim and are configured to inhibit separation of the top from the base. The bearing is located in a second peripheral groove between the first peripheral groove and the inner rim. The first dimension is larger than the second dimension to provide an offset, and the first peripheral groove is configured to catch debris that falls between the top and the base.

The present invention further relates to various features and combinations of features shown and described in the disclosed embodiments. Other ways in which the objects and features of the disclosed embodiments are accomplished will be described in the following specification or will become apparent to those skilled in the art after they have read this specification. Such other ways are deemed to fall within the scope of the disclosed embodiments if they fall within the scope of the claims which follow.

DETAILED DESCRIPTION OF PREFERRED AND OTHER EXEMPLARY EMBODIMENTS

Figure 1:
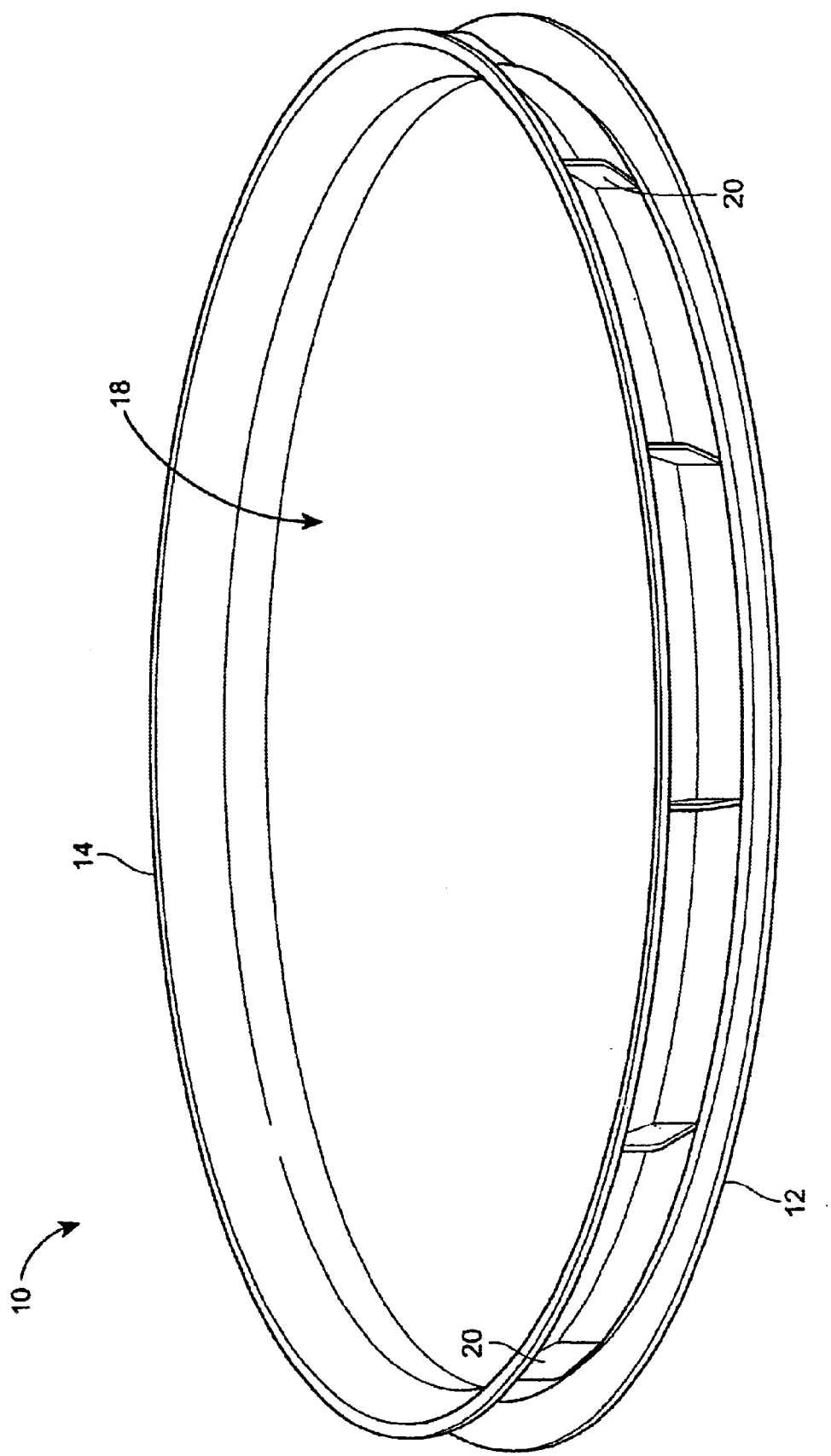
FIG. 1 is a top perspective view of a turntable according to an exemplary embodiment.

Before proceeding to the detailed description of the preferred and exemplary embodiments, several comments can be made about the general applicability and the scope thereof.

First, while the components of the disclosed embodiments will be illustrated as a turntable designed for kitchen uses and applications, the features of the disclosed embodiments have a much wider applicability. For example, the offset design is adaptable for other storage units, bins, containers, and other office, home, school, retail establishment and other products which employ a storage space configured to rotate relative to a base. Further, the size of the various components and the size of the turntable can be widely varied.

Second, the particular materials used to construct the exemplary embodiments are also illustrative. For example, injection molded high density polyethylene is the preferred method and material for making the top and base, but other materials can be used, including other thermoplastic resins such as polypropylene, other polyethylenes, acrylonitrile butadiene styrene ("ABS"), polyurethane nylon, any of a variety of homopolymer plastics, copolymer plastics, plastics with special additives, filled plastics, etc. Also, other molding operations may be used to form these components, such as blow molding, rotational molding, etc. Components of the turntable can also be manufactured from stamped alloy materials such as steel or aluminum.

Third, it is important to note that the term "turntable," "base," "top," "bearing," and "bin" are intended to be broad terms and not terms of limitation. For example, while the illustrations show a single, circular surface, the top could include multiple, spaced-apart layers, which in turn could have the same or different diameters. Also, the storage may be circular (as shown), square, rectangular, etc. In addition, the user interface may be a plurality of projections (as shown), indentations, etc. These components may be used with any of a variety of products or arrangements and are not intended to be limited to use with kitchen applications.

Proceeding now to descriptions of the preferred and exemplary embodiments, FIGS. 1–4 show a turntable 10 according to an exemplary embodiment. Turntable 10 includes a stationary base 12 and a top 14 rotatably mounted to the base 12.

The top 14 may have a variety of configurations and arrangements of storage spaces 18 (e.g., planar, multi-level shelving, one or more compartments or bins, etc.) for holding or supporting one or more items 13. FIGS. 5–11 show top 14 according to a variety of alternative embodiments.

Figure 4:
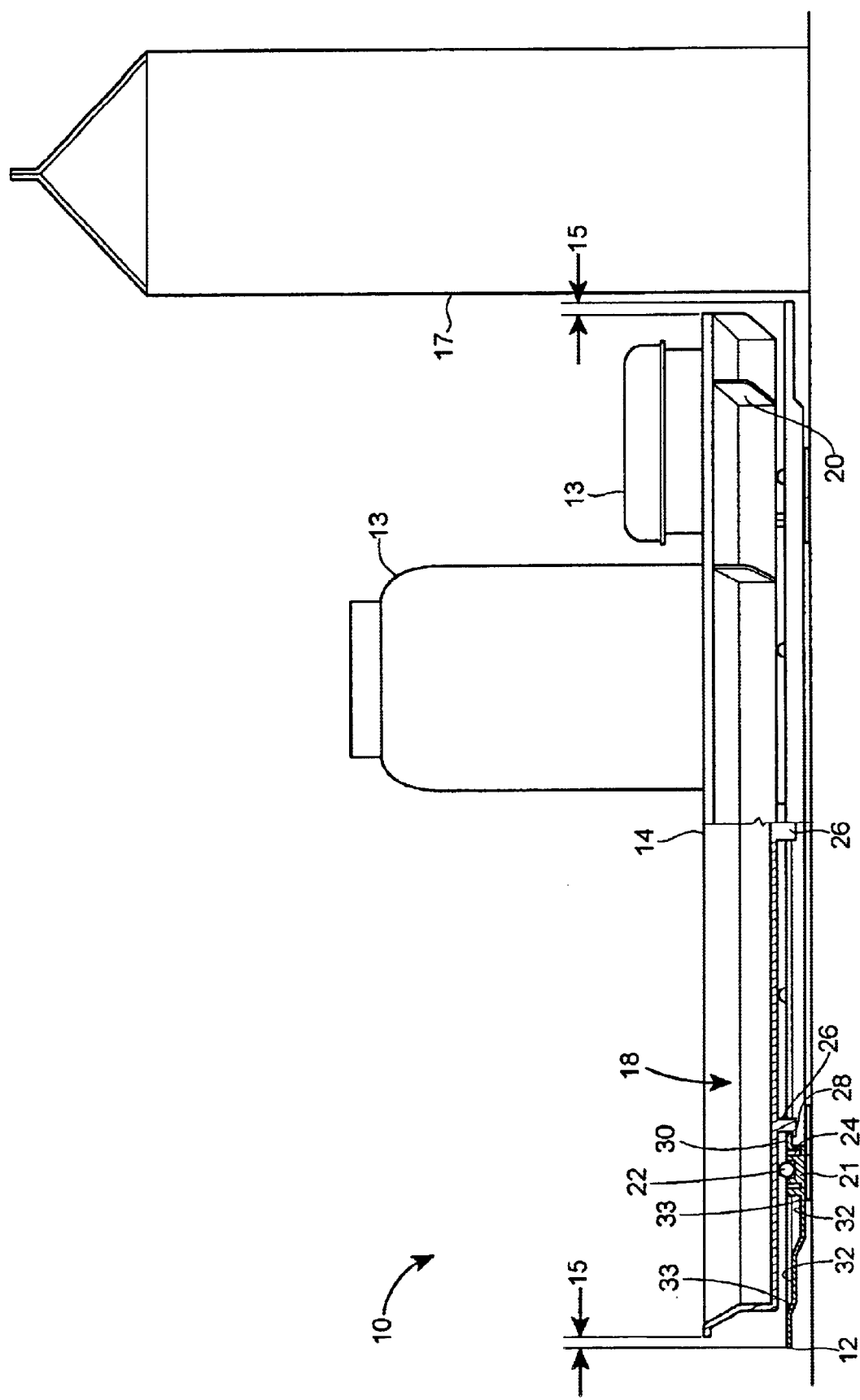
FIG. 4 is a fragmentary sectional view of the turntable of FIG. 1.
Figure 6:
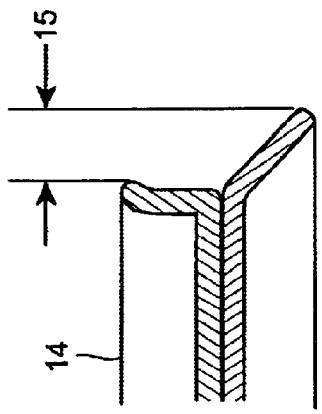
FIGS. 5–9 are fragmentary sectional views of turntables according to alternative embodiments.
Figure 8:
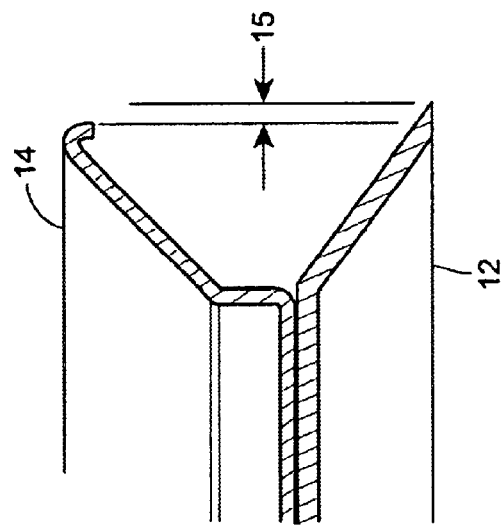
Figure 5:
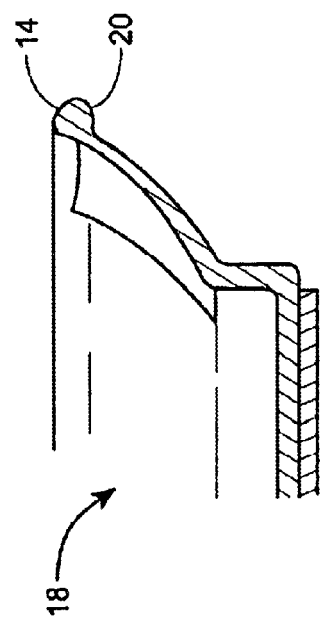
Figure 7:
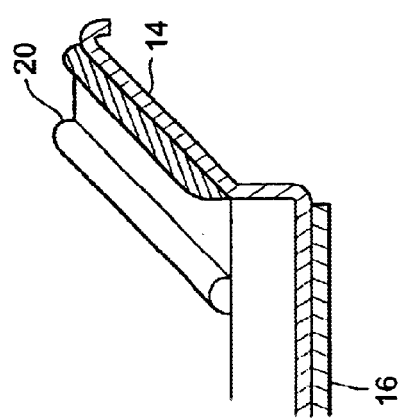
Figure 9:
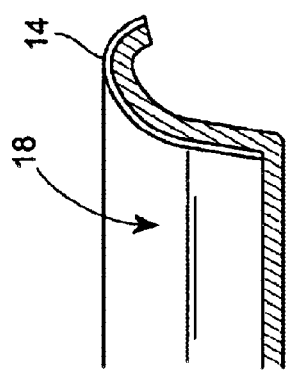
Figure 10:
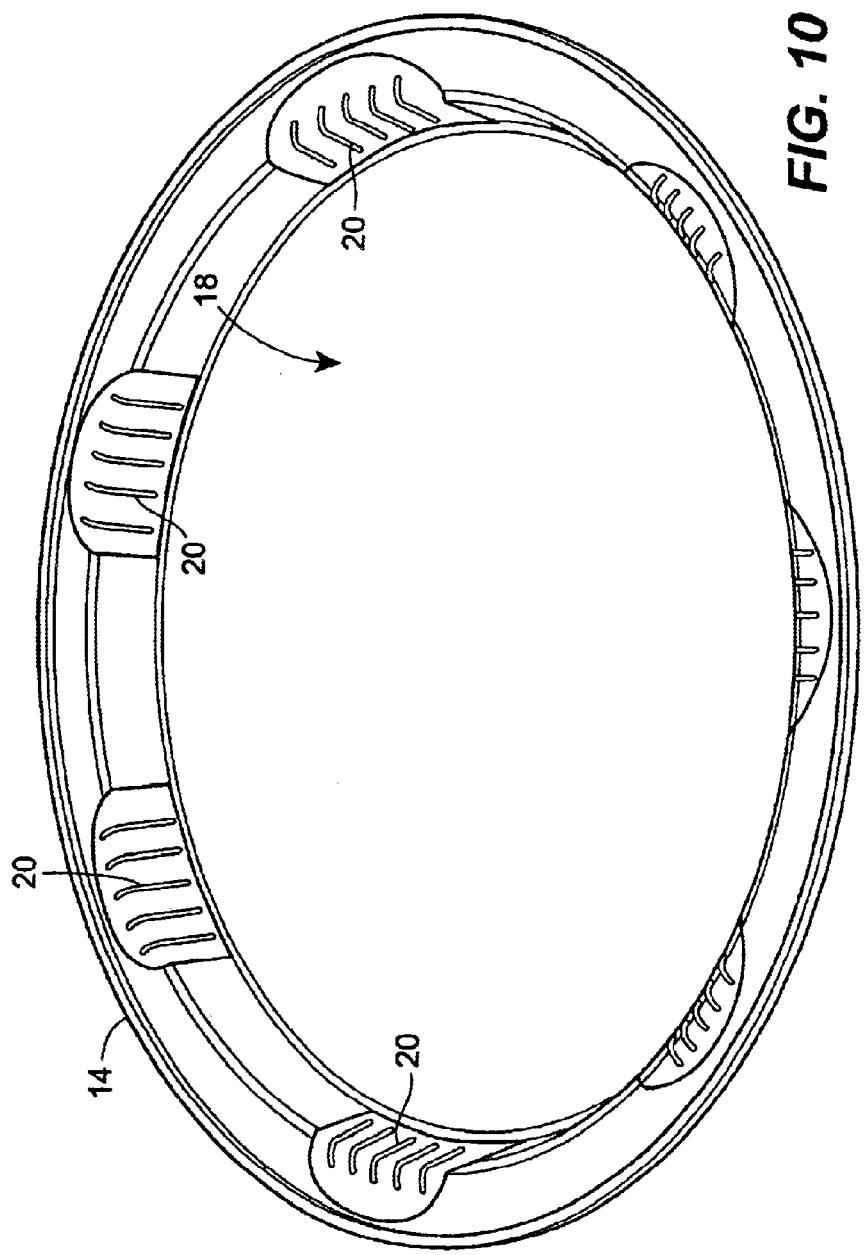
FIG. 10 is a perspective view of the turntable of FIG. 9.

Referring to FIGS. 4, 6, and 8, base 12 is configured to have a larger diameter than top 14, thereby providing an offset 15 so that objects 17 placed next to turntable 10 do not impede rotation of top 14.

According to an exemplary embodiment, offset 15 is greater than about 1/32". According to a preferred embodiment, offset 15 is between about 1/16" and about 1/2". According to alternative embodiments, offset 15 is greater than about 1/2". According to other exemplary embodiments, the amount of offset 15 is dependent on the environment in which the turntable is used. For example, in a kitchen application (e.g., in a refrigerator or a cabinet), offset 15 is minimal because objects 17 adjacent turntable 10 will not tend to extend into the space of top 14 (e.g., soft-sided items that sag or crumple). In other environments, such as workshops or garages, adjacent objects 17 (e.g., fertilizer, grass seed, etc.) may tend to extend into adjacent space beyond base 12. By providing the appropriate offset 15, turntable 10 continues to operate even when objects 17 are stored directly adjacent to it (including when adjacent objects 17 are stored in contact with base 12).

Figure 2:
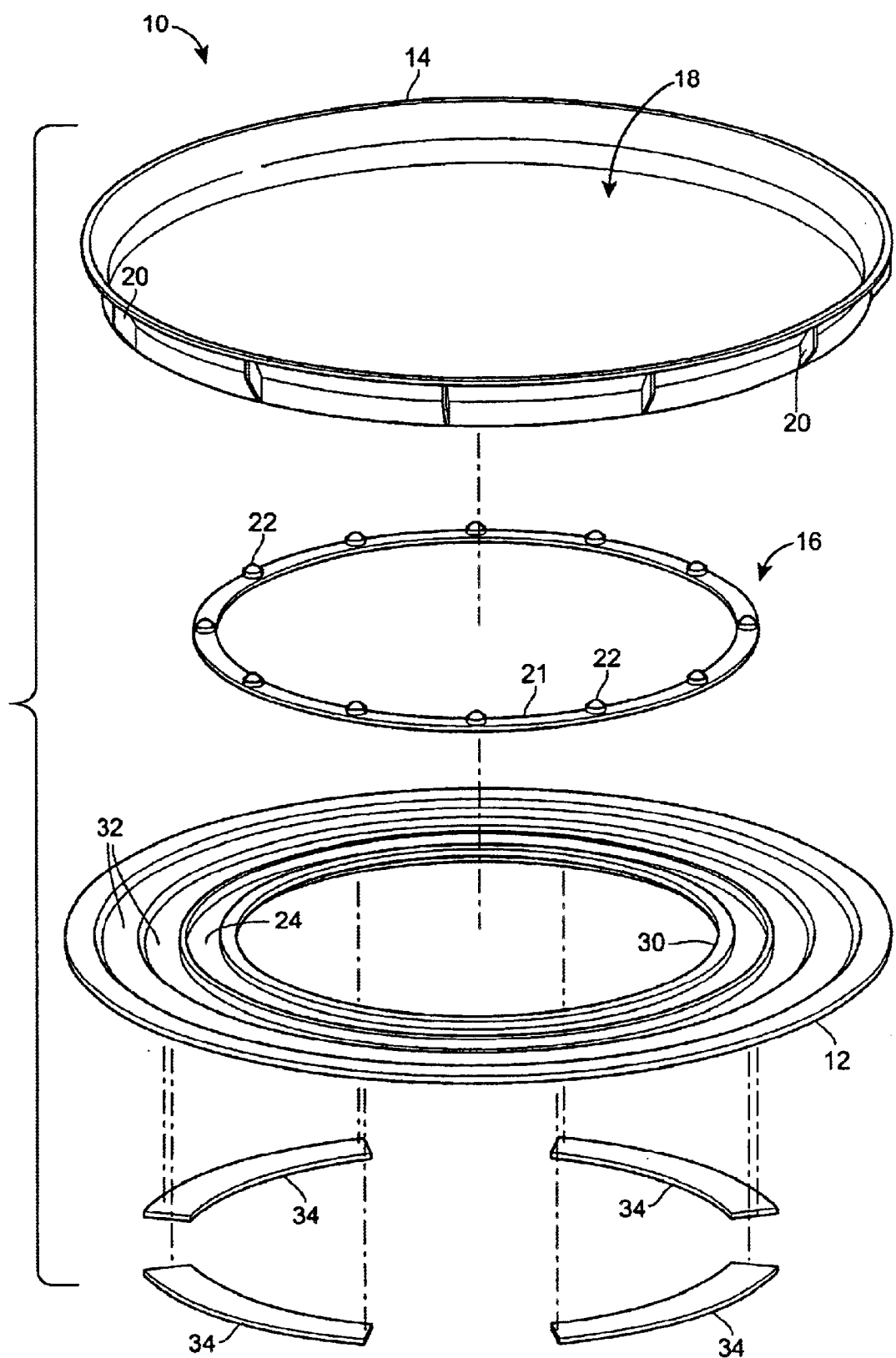
FIG. 2 is an exploded top perspective view of the turntable of FIG. 1.
Figure 3:
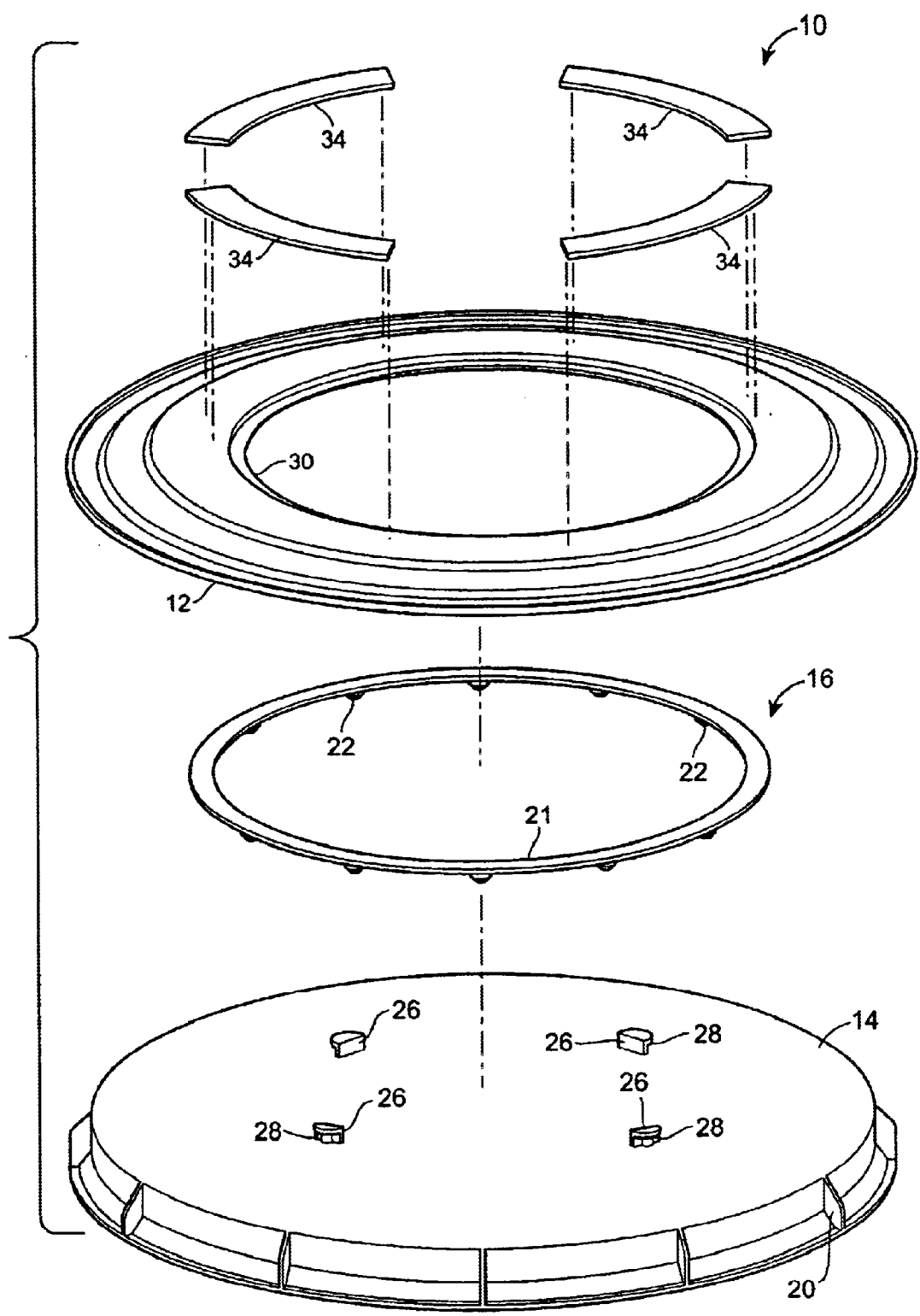
FIG. 3 is an exploded bottom perspective view of the turntable of FIG. 1.

Referring to FIGS. 2–4, a bearing 16 is located between base 12 and top 14. According to a preferred embodiment, bearing 16 includes a bearing retaining member or ring 21 and a plurality of ball bearings 22 coupled thereto. Ring 21 is positioned in a groove 24 on base 12 and is configured to move as top 14 is moved relative to base 12. Alternatively, any type of bearing may be used (e.g., roller bearing, etc.).

Referring to FIG. 3, top 14 includes a plurality of hooks or clips 26 configured to engage base 12. Clips 26 each include a flange 28 that engages a rim 30 on base 12 (e.g., in a snap-fit engagement). Clips 26 are configured to securely couple top 14 to base 12 and inhibit dislodgment, allow for easy movement of turntable 10, and the like.

According to a preferred embodiment, base 12 includes an integrally molded groove 32. Groove 32 is configured to receive or catch debris 33 (e.g., crumbs, liquids or the like) that may fall between base 12 and top 14. By collecting debris 33 in groove 32, debris would not interfere with bearing 16. Groove 32 is also intended to provide for easy clean-up of turntable 10.

One or more pads 34 may be attached to a bottom side 36 of base 12. According to a preferred embodiment, pads 34 are made from non-skid material. As such, pads 34 are intended to keep turntable 10 from slipping on any of a variety of surfaces (e.g., countertop, shelf, refrigerator surface, etc.) and to provide stability during operation. Pads 34 may be made from any of a variety of materials that provide a "non-skid" surface (e.g., natural or synthetic rubber, other elastomers, etc.).

Top 14 also may include a user interface (shown as a plurality of projections 20 (e.g., rib, fin, etc.)) configured to provide an interface for the user to operate the turntable. Projections 20 are also intended to provide indicia so that the tray may be stopped at specific positions or increments. To assist in such precise positioning, labels or other informational devices may be included with the user interface.

Figure 11:
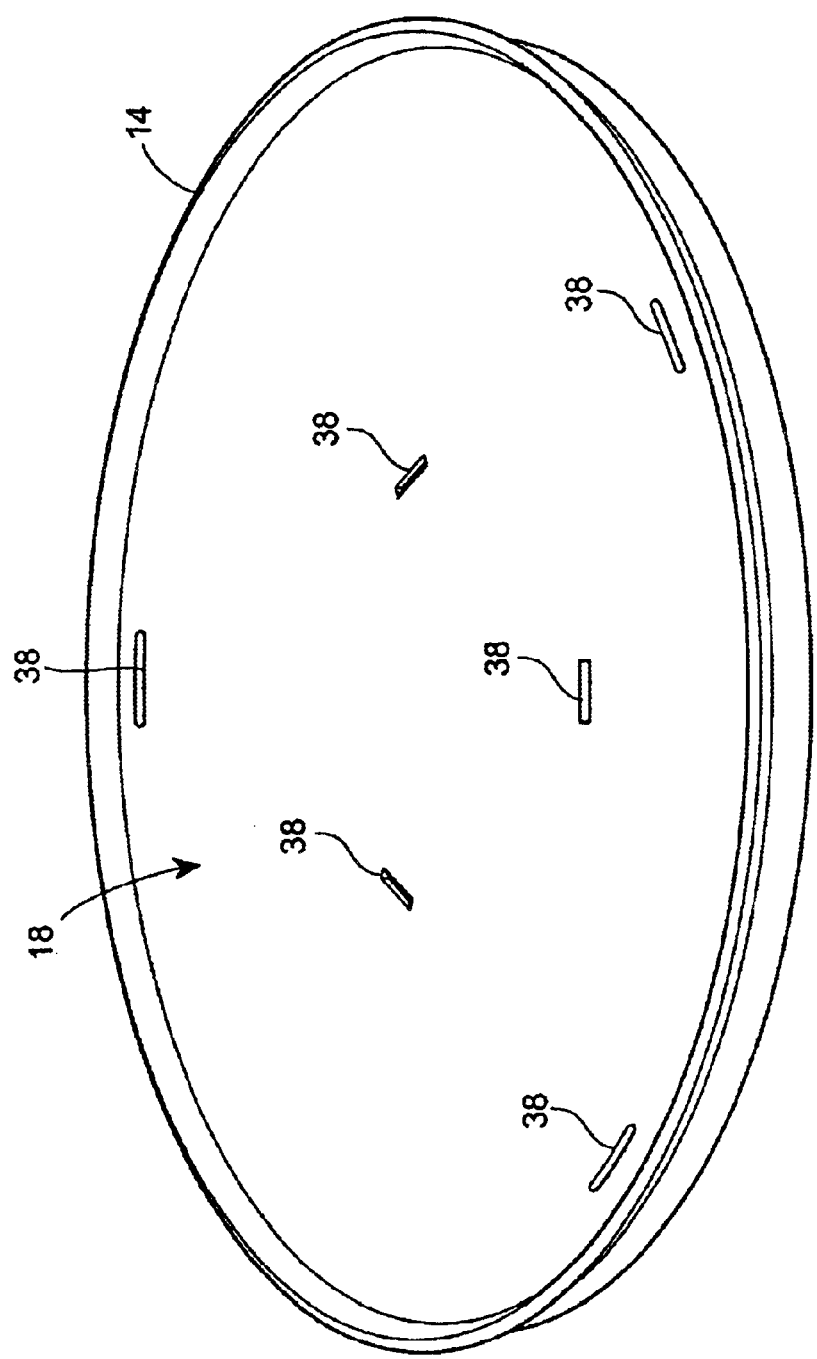
FIG. 11 is a top perspective view of a turntable according to an alternative embodiment.
Figure 15:
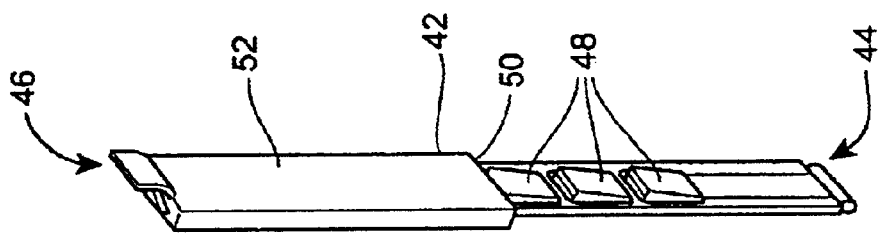
FIG. 15 is a perspective view of a turntable bracket.
Figure 14:
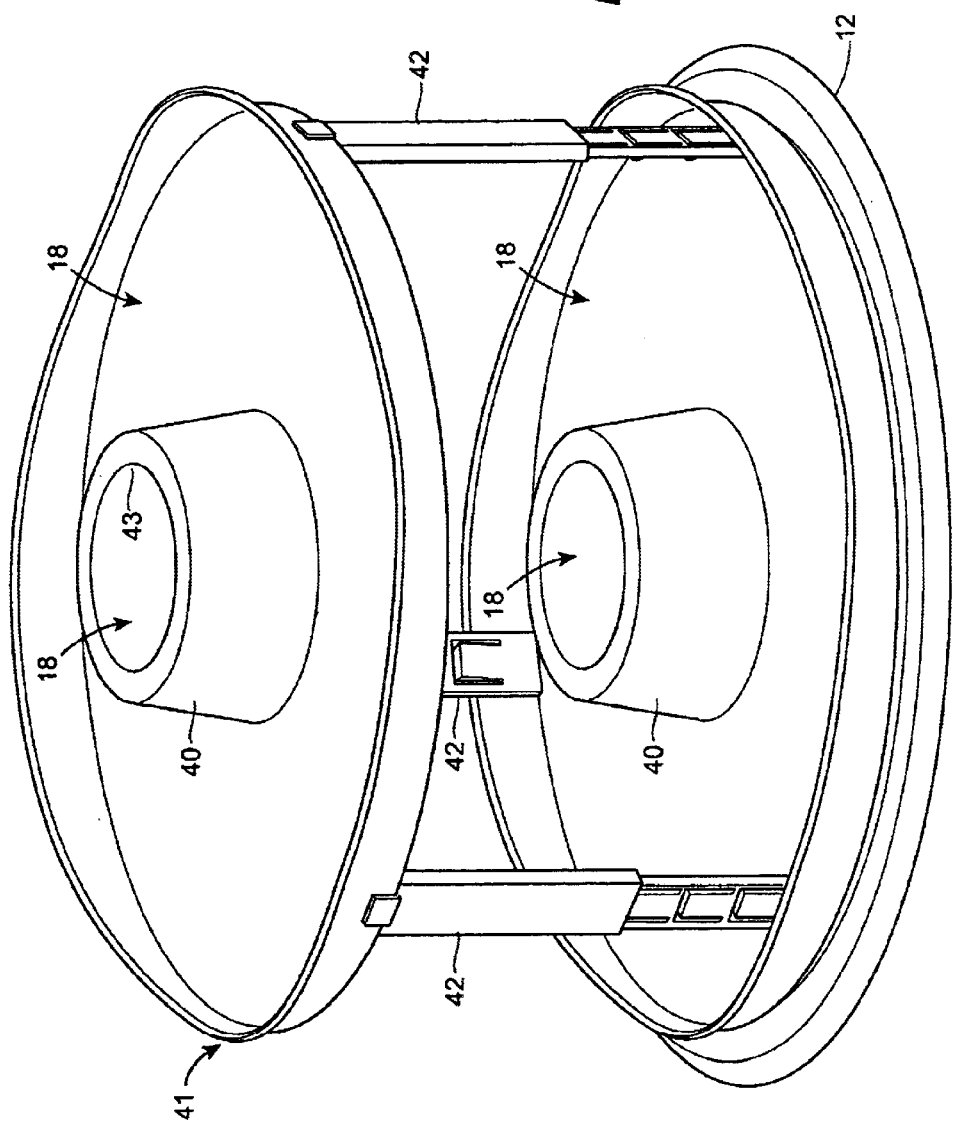
FIG. 14 is a top perspective view of a turntable according to an exemplary embodiment.

According to an exemplary embodiment shown in FIGS. 14 and 15, top 14 includes structure for attaching accessories to provide additional storage space or to reconfigure existing storage space. Referring to FIG. 11, top 14 is shown having apertures 38 for attaching such accessories. For example, the accessories can include secondary storage surface such as a cap 40, an upper shelf 41, a lid (i.e., to allow one to use the turntable as a food storage container), and the like.

Figure 12:
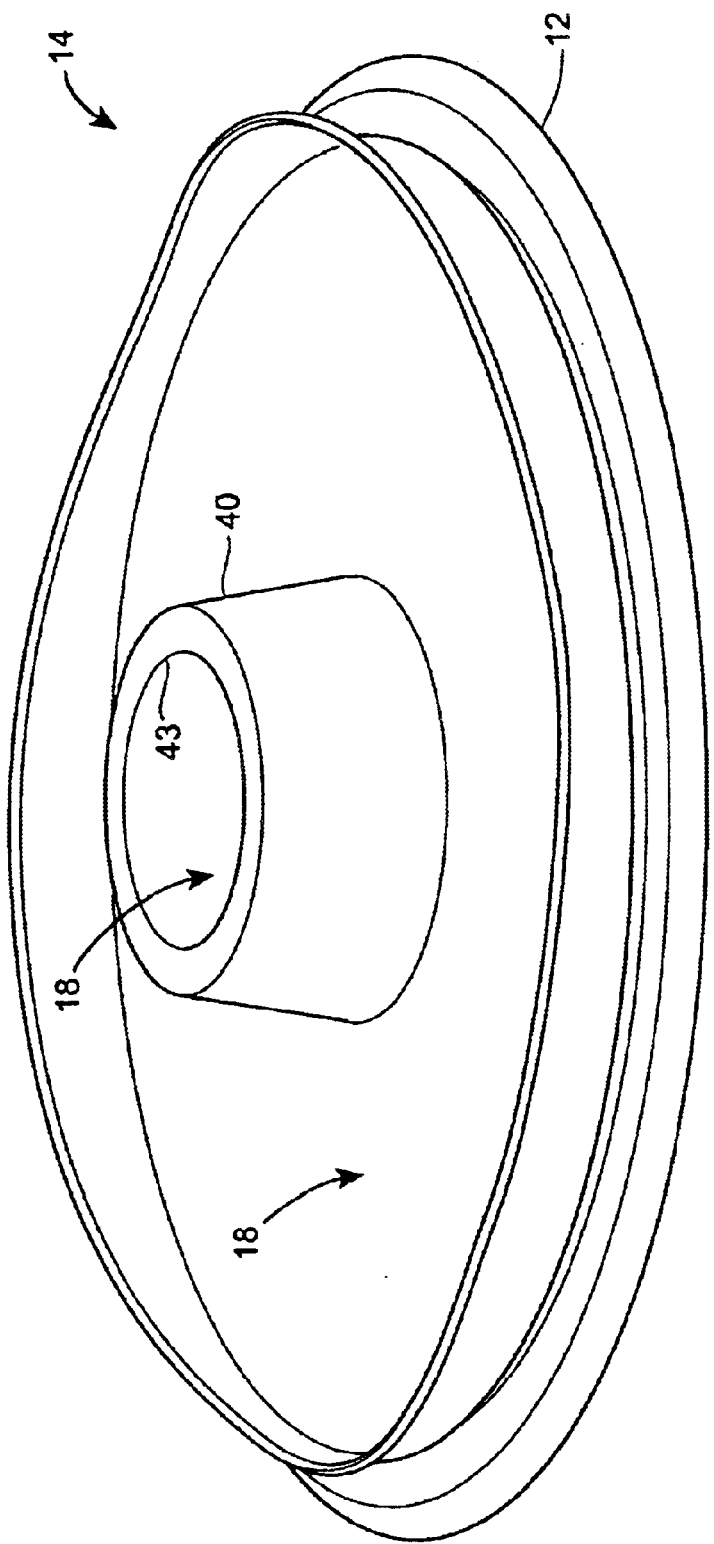
FIG. 12 is a top perspective view of a turntable according to an exemplary embodiment.
Figure 13:
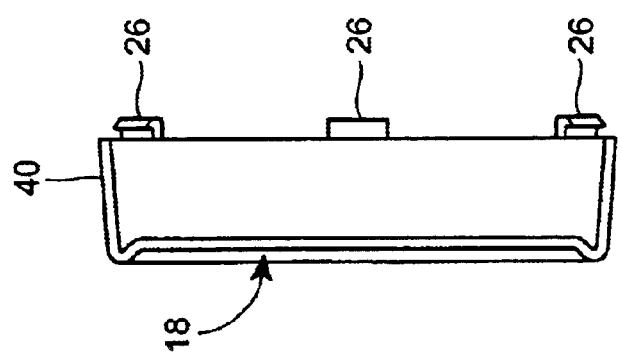
FIG. 13 is a side view of a turntable cap.

Referring to FIGS. 12 and 13, cap 40 is configured to attach to top 14 in order to elevate a portion of storage space 18 (i.e., making it easier for users to reach or view items 13 placed thereon). Cap 40 may be especially useful when items 13 are small and difficult to see. Cap 40 may have any of a variety of configurations and arrangements of storage spaces 18 (e.g., recesses 43, slots, etc.) depending on the desired arrangement. As shown in FIG. 13, cap 40 includes a plurality of hooks or clips 26 to engage apertures 38 in the center of top 14. Clips 26 are inserted through apertures 38 thereby fastening cap 40 to top 14 (e.g., in a snap-fit engagement).

Referring to FIGS. 14 and 15, second storage shelf 41 is mounted to top 14 by a support bracket 42. Second storage shelf is shown as being similar to top 14, but may have any of a variety of configurations. Referring to FIG. 15, support bracket 42 includes a first end 44 having a hook or clip 26 to engage apertures 38 near the edge of top 14. A second end 46 of support bracket 42 attaches to shelf 41 thereby forming a turntable having multiple layers of storage spaces 18. Additional apertures 38 may be provided so that additional shelves can be mounted to the turntable.

Support bracket 42 is configured to vary lengthwise to allow the user to modify the turntable to increase or decrease the space between the various layers to accommodate items 13 having varying heights. As shown in FIG. 15, support bracket 42 includes tabs 48 that engage edge 50 of housing 52 (e.g., in a snap-fit engagement). Tabs 48 can be disengaged by depressing tabs 48 so that edge 50 of housing 52 no longer contacts tabs 48 allowing housing 52 to slide over tabs 48 and engage another tab 48 at a different position.

Figure 16:
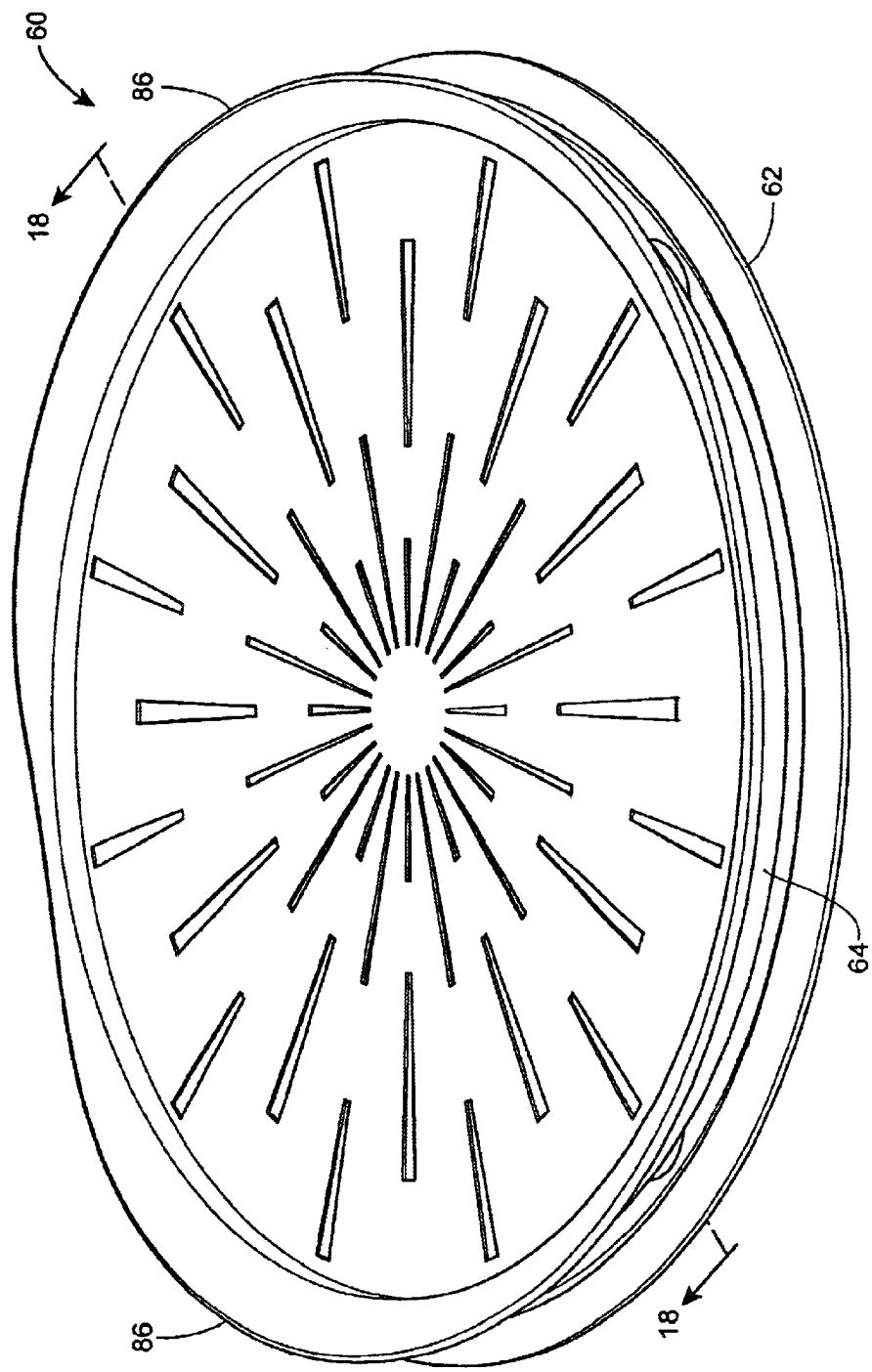
FIG. 16 is a top perspective view of a turntable according to a preferred embodiment.
Figure 17:
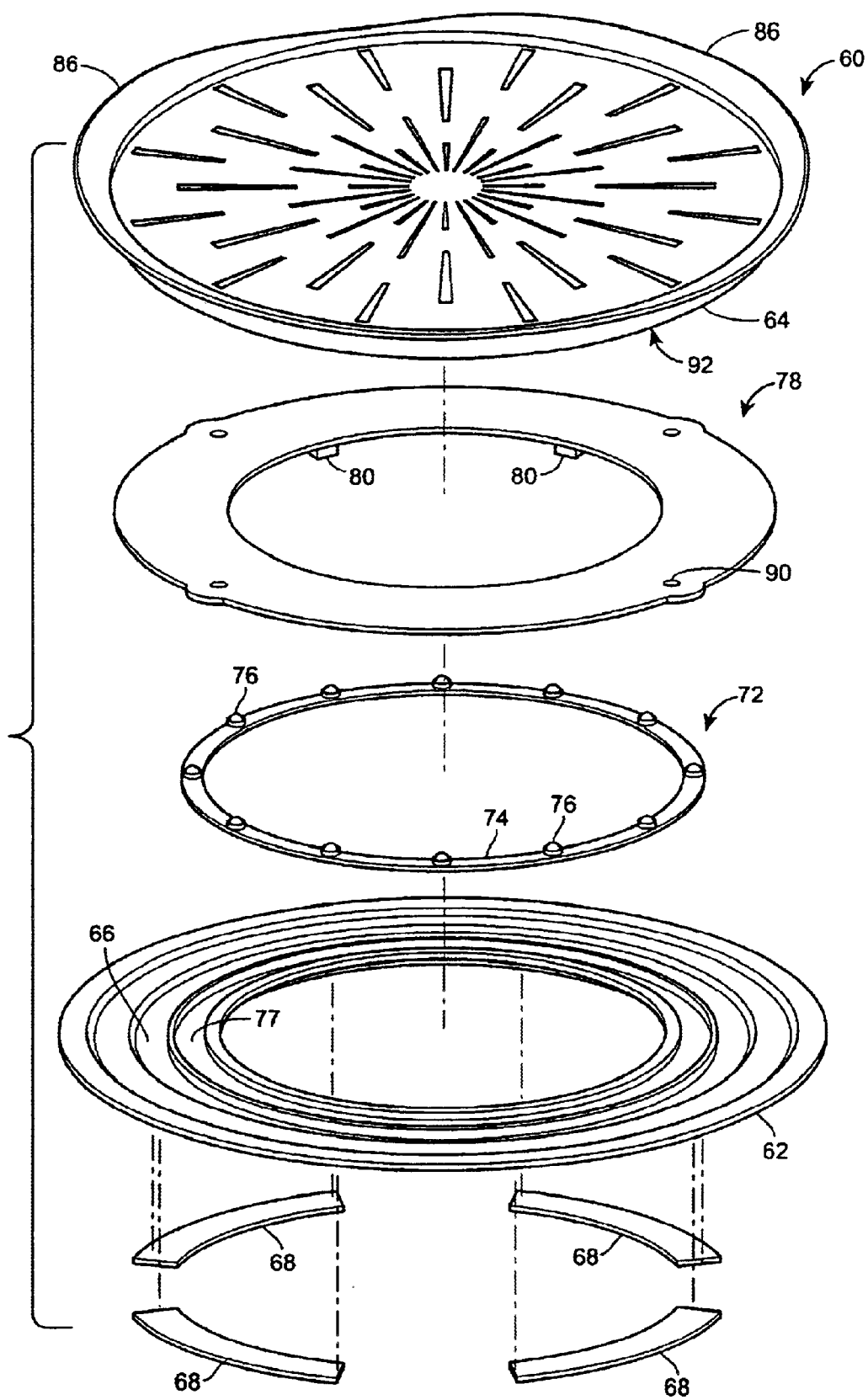
FIG. 17 is an exploded top perspective view of the turntable of FIG. 16.
Figure 18:
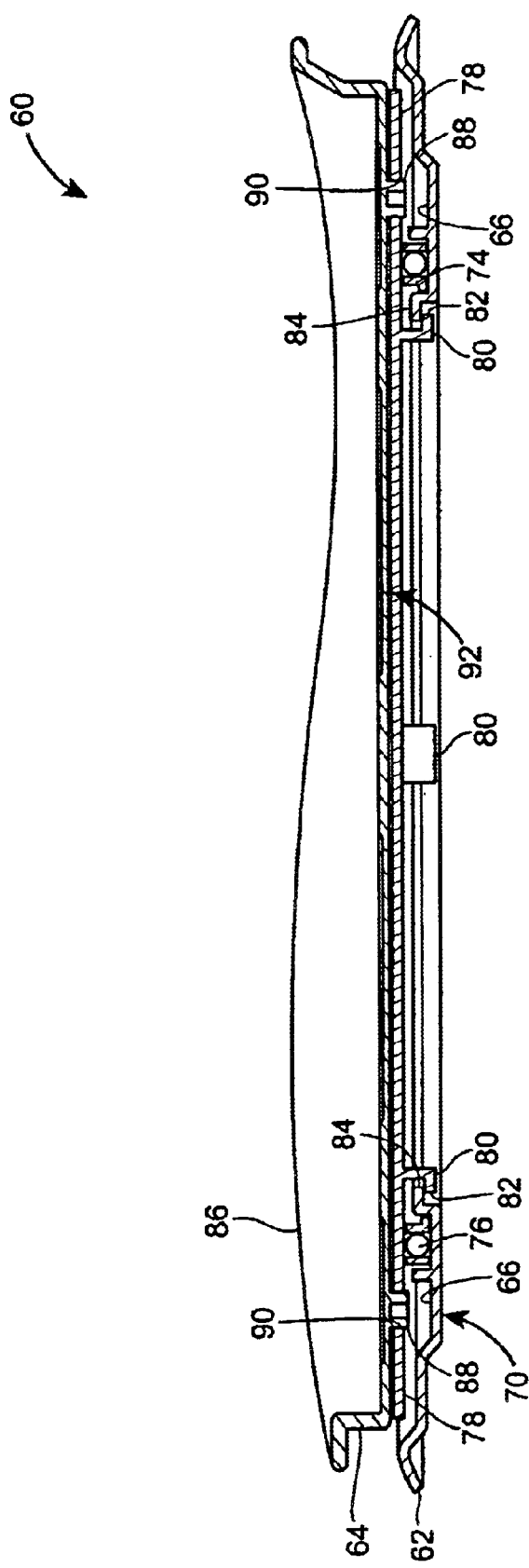
FIG. 18 is a sectional view of the turntable of FIG. 16 taken along the line 18—18.

FIGS. 16–18 show a turntable 60 according to a preferred embodiment. Turntable 60 includes a base 62 and a top 64 rotatably mounted to base 62.

Base 62 is configured to have a larger diameter than top 64, thereby providing an offset so that objects placed next to turntable 60 do not impede rotation of top 64. By providing the offset, turntable 60 is configured to continue to operate even when objects are stored directly adjacent to it (including when adjacent objects are stored in contact with base 62). Base 62 includes an integrally molded groove 66 configured to receive or catch debris (e.g., crumbs, liquids or the like) that may fall between base 62 and top 64. One or more pads 68 are attached to a bottom surface 70 of base 62. Pads 68 are made from non-skid material intended to keep turntable 60 from slipping on any of a variety of surfaces (e.g., countertop, shelf, refrigerator surface, etc.) and to provide additional stability during operation.

A bearing is located between base 62 and top 64. Bearing 72 includes a bearing retainer member 74 and a plurality of ball bearings 76 captured in a plurality of sockets (e.g., bearing "cage" or the like). (Preferably, bearing is a thrust bearing; alternatively any type of bearing may be used, such as roller bearings, a low friction member, and the like)

Bearing 72 is positioned in groove 77 on base 62 and is captured between base 62 and a rotating member 78 (thereby providing a lower race and an upper race, respectively). Rotating member 78 includes a plurality of mounting hooks or clips 80 configured to engage base 62. Clips 80 each include a flange 82 that engages an interior rim 84 on base 62 (e.g., in a snap-fit engagement). Clips 80 are configured to couple rotating member 78 to base 62 to inhibit dislodgment or undesired removal of bearing 72, and to slide along interior rim 84 as top 64 is rotated.

Top 64 includes a user interface (shown as an arcuate rim 86 configured to provide an interface for the user to operate turntable 60 and is mounted to rotating member 78 by a plurality of projections 88 engaging a plurality of apertures 90. Preferably, projections 88 extend down from a bottom surface 92 of top 64 and are press-fit into apertures 90 located in rotating member 78 (e.g., in a interference fit). Removable engagement of top 64 and rotating member 78 is configured to allow for quick and easy removal of top 64 from rotating member 78 (and base 62) so that top 64 can be cleaned (e.g., in a dishwasher), replaced, used as a serving piece, and the like, and for quick and easy reinstallation of top without disturbing or exposing bearing 72. (Rotating member 78 and bearing 72 may also be removed from base 62 by flexing clips 80.)

It is also important to note that the construction and arrangement of the elements of the turntable as shown in the preferred and other exemplary embodiments are illustrative only. Although only a few embodiments of the present invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the claims. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and/or omissions may be made in the design, operating conditions and arrangement of the preferred and other exemplary embodiments without departing from the spirit of the present invention as expressed in the appended claims.

What is claimed is:

1. A turntable for storing at least one item, the turntable comprising:

a base having a first dimension;

a top rotatably coupled to the base and having a second dimension and at least one surface for storing the at least one item;

a bearing disposed between the base and the top;

a rotating member coupled to the base so that the bearing is disposed between the base and the rotating member;

wherein the top is mounted to the rotating member and configured for quick and easy removal from the rotating member;

wherein the base includes a peripheral groove disposed between the bearing and an exterior edge of the base, the groove being configured to catch debris which falls between the top and the base; and wherein the first dimension is larger than the second dimension to provide an offset so that objects stored adjacent the base do not interfere with rotation of the top.

2. The turntable of claim 1 wherein the offset is greater than about 1/32 inch.

3. The turntable of claim 2 wherein the offset is between about 1/16 inch and about 1/2 inch.

4. The turntable of claim 2 wherein the offset is greater than about 1/2 inch.

5. The turntable of claim 1 wherein the rotating member is movably coupled to the base with at least one mounting hook.

6. The turntable of claim 1 wherein the top includes a user interface configured to be used by a user when turning the top.

7. The turntable of claim 1 wherein the base and top are circular and wherein the first and second dimensions are diameters.

8. A turntable for storing at least one item, the turntable comprising:

a base;

a top rotatably coupled to the base and having at least one surface for storing the at least one item;

a bearing disposed between the base and the top;

a rotating member coupled to the base so that the bearing is disposed between the base and the rotating member;

wherein the base includes a peripheral groove disposed between the bearing and the exterior edges of the base;

wherein the rotating member is movably coupled to the base with at least one mounting hook; and wherein the top is mounted to the rotating member and configured for quick and easy removal from the rotating member.

9. The turntable of claim 8 wherein the base comprises a first dimension representative of a maximum distance between exterior edges of the base and the top comprises a second dimension representative of a maximum distance between exterior edges of the top, wherein the first dimension is larger than the second dimension to provide an offset.

10. The turntable of claim 9 wherein the offset is greater than about 1/32 inch.

11. The turntable of claim 8 wherein the base and top are circular and the first and second dimensions are diameters.

12. The turntable of claim 8 where in the bearing includes a plurality of ball bearings coupled to a retaining member.

13. The turntable of claim 8 further including a secondary storage surface.

14. The turntable of claim 13 wherein the secondary storage surface is coupled to the top by a plurality of brackets.

15. The turntable of claim 13 wherein the secondary storage surface is a cap coupled to the top.

16. A turntable for storing at least one item, the turntable comprising:

a base having a first diameter, an inner rim, and a first peripheral groove;

a top rotatably coupled to the base and having a second diameter, at least one surface for storing the at least one item, and at least one hook that slidably engages the inner rim, the at least one hook configured to inhibit separation of the top from the base;

a bearing disposed between the base and the top, and located in a second peripheral groove between the first peripheral groove and the inner rim;

a rotating member coupled to the base so that the bearing is disposed between the base and the rotating member, wherein the rotating member is movably coupled to the base with at least one mounting hook;

wherein the top is mounted to the rotating member and includes at least one projection configured to releasably engage a corresponding aperture in the rotating member; and wherein the first diameter is larger than the second diameter to provide an offset, and the first peripheral groove is configured to catch debris that falls between the top and the base.

17. The turntable of claim 16 wherein the offset is greater than about 1/32 inch.

18. The turntable of claim 16 wherein the top includes a user interface configured to be used by a user when rotating the top.

19. The turntable of claim 18 wherein the user interface includes one of a plurality of projections and indicia.

20. The turntable of claim 16 wherein the bearing includes a plurality of ball bearings coupled to a retaining ring.

21. The turntable of claim 16 further including a secondary storage surface.

22. The turntable of claim 21 wherein the secondary storage surface is coupled to the top by a plurality of brackets.

23. The turntable of claim 22 wherein the secondary storage surface is a cap coupled to the top by a plurality of clips and configured to be generally smaller than the top.

* * * * *

UNITED STATES PATENT AND TRADEMARK OFFICE
CERTIFICATE OF CORRECTION

PATENT NO. : 6,854,608 B2  Page 1 of 1
DATED : February 15, 2005
INVENTOR(S) : Carolyn M. McNeeley et al.

It is certified that error appears in the above-identified patent and that said Letters Patent is hereby corrected as shown below:

Column 6,
Line 39, please insert -- wherein the top includes at least one projection configured to releasably engage a corresponding aperture in the rotating member; --.

Column 7,
Line 6, please insert -- wherein the top includes at least one projection configured to releasably engage at least one aperture in the rotating member; and --.

Signed and Sealed this

First Day of November, 2005

JON W. DUDAS
*Director of the United States Patent and Trademark Office*